July 17, 1956　　　　　　　　O. ESTES　　　　　　　　2,754,739
PLOWS
Filed July 5, 1951　　　　　　　　　　　　　　　　4 Sheets-Sheet 2
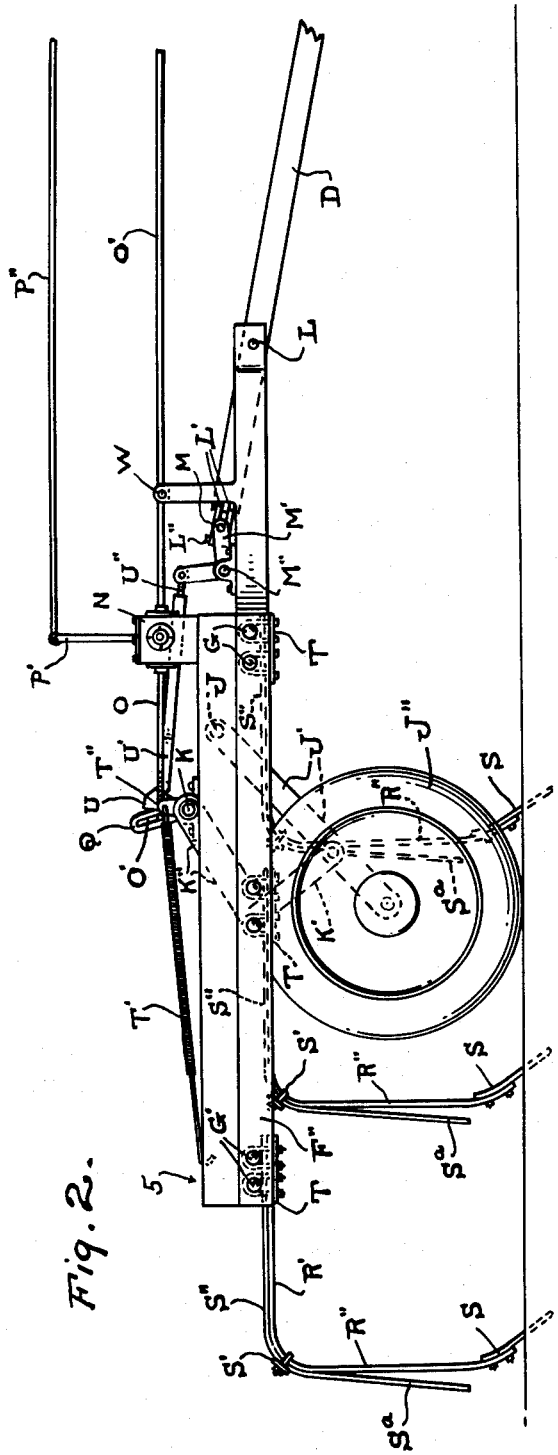
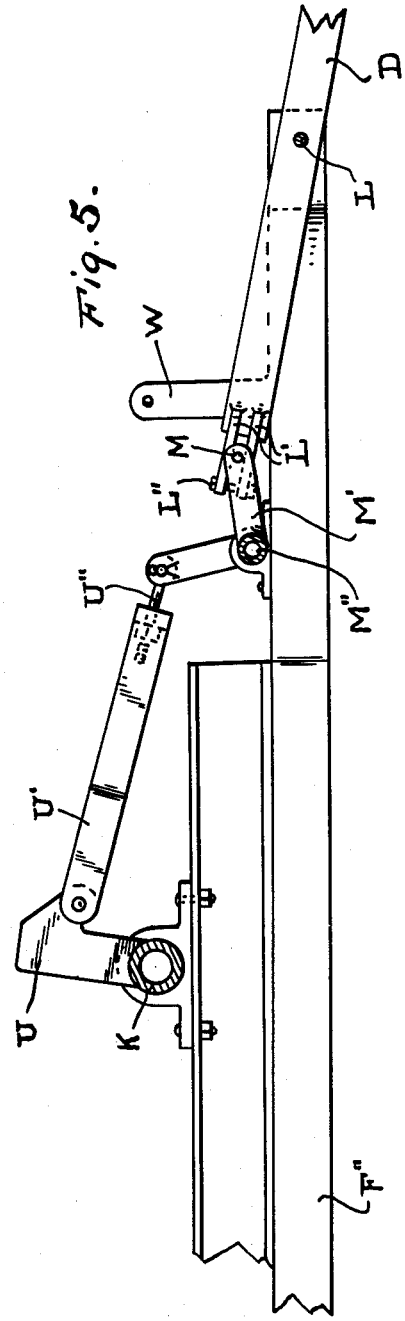
INVENTOR
Otto Estes
BY L. B. James
ATTORNEY

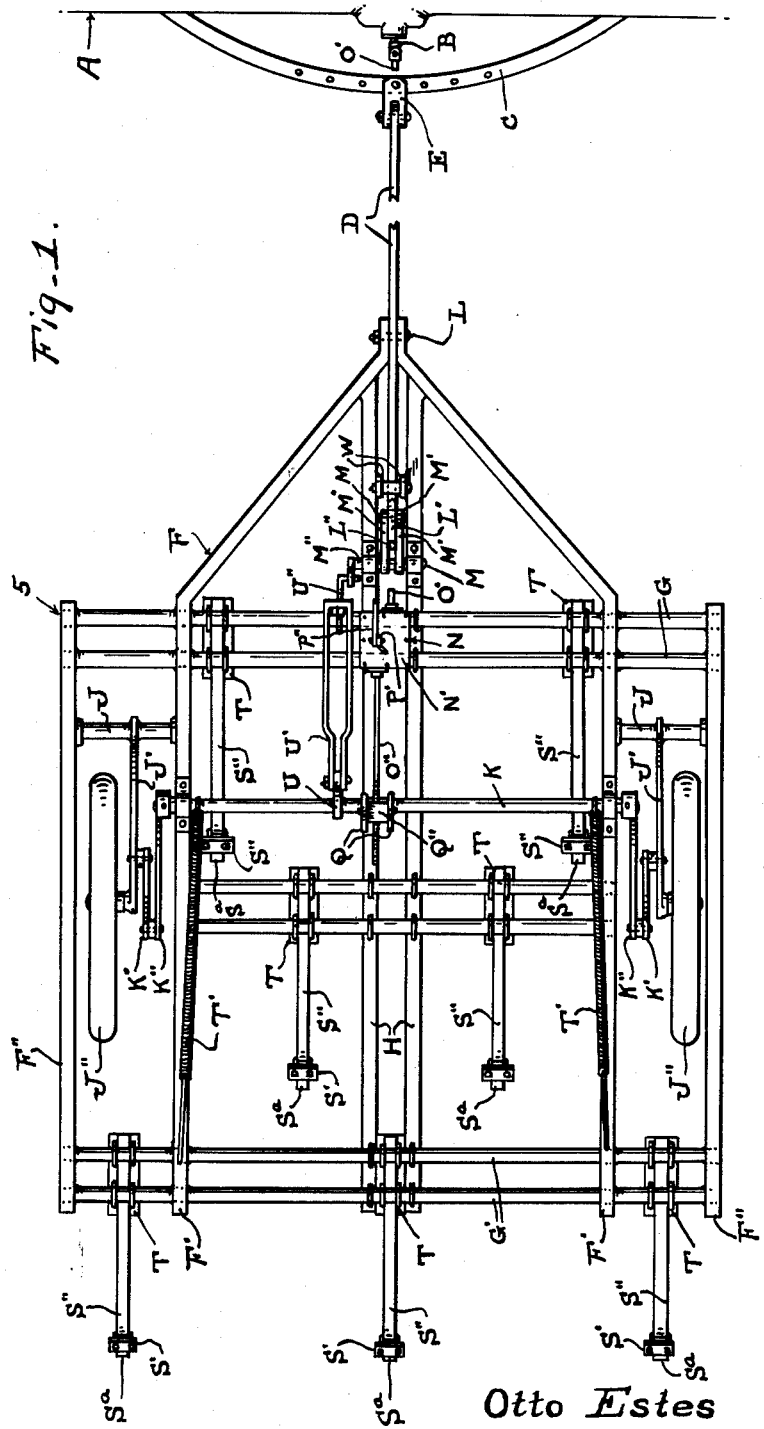

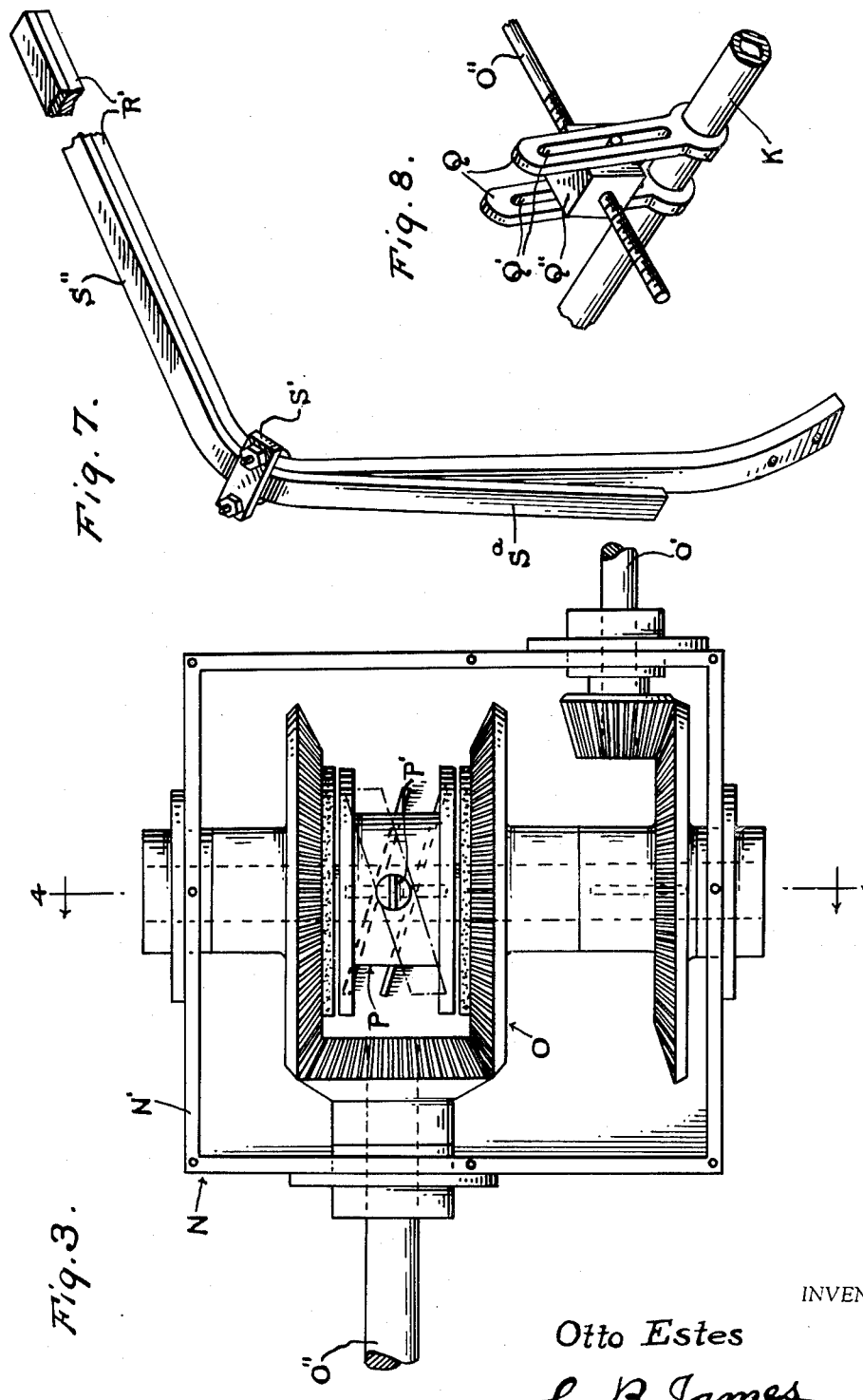

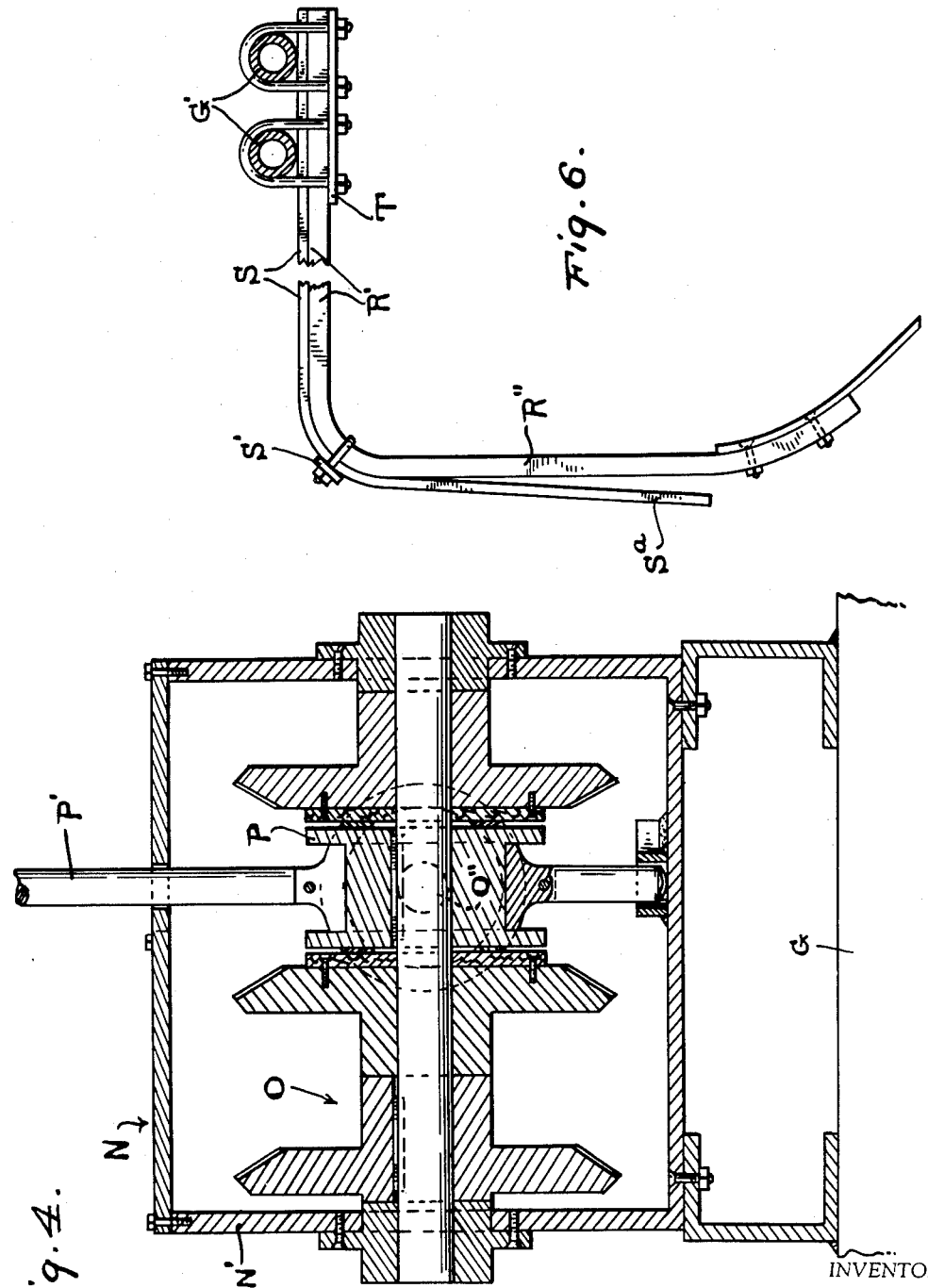

United States Patent Office 2,754,739
Patented July 17, 1956

2,754,739

PLOWS

Otto Estes, Altus, Okla.

Application July 5, 1951, Serial No. 235,240

3 Claims. (Cl. 97—46.33)

This invention relates to agricultural implements and more particularly improvements on the plow set forth in my application Ser. No. 131,864, now abandoned, and this application is a companion to my application Ser. No. 235,239, now abandoned, for improvements in check bars for resilient plow beams.

One of the objects of this invention resides in the provision of levelling means adapted to simultaneously manipulate the plow supporting frame and regulate the angularity of the draw bar connected thereto so as to maintain the plow blades at predetermined depths.

Another object of this invention resides in the provision of a certain embodiment of coacting elements connecting the ground wheel manipulating shaft with the draw bar so as to impart a wide range of adjustment between the same and plow frame for maintaining the plow blades at elected depths in the ground.

A further object of this invention resides in the particular assemblage of elements connecting the draw bar to the wheel manipulating means of the plow.

A still further object of this invention resides in the provision of means adapted to limit and thereafter resist bending of the plow beams beyond a predetermined angle relative to their fixed body portions.

Aside from the aforesaid objects, this invention resides in the particular manner of assembling the check bar on the resilient plow beams.

With these and other objects in view, this invention resides in certain novel features of construction and arrangement of elements to be hereinafter more particularly set forth in the specification, illustrated in the accompanying drawings and pointed out in the appended claims and, although this disclosure depicts my present conception of the invention, the right is reserved to resort to such departures therefrom as come within the scope of the claims.

In the accompanying drawings forming a part of this application;

Fig. 1 is a plan view of the plow connected to the rear portion of a conventional tractor.

Fig. 2 is a side view thereof.

Fig. 3 is an enlarged plan view of the power transmission with the cover thereof removed.

Fig. 4 is a vertical sectional view of the power transmission taken approximately on line 4—4 of Fig. 3.

Fig. 5 is an enlarged side view of the rear end of the draft bar.

Fig. 6 is an enlarged side view of one of the plow beams connected to the cross beam.

Fig. 7 is a perspective view of one of the plow beams.

Fig. 8 is a perspective view of the rocker shaft and rocking means connected thereto.

In the present embodiment of this invention, the letter A designates the rear portion of a conventional tractor which, among other well known elements, includes a power take-off shaft B and draft beam C connecting an adjustable wheel plow 5 forming the subject matter of this application thereto through the instrumentality of a draft bar D and suitable clevis E.

The plow 5 includes a substantially V-shaped frame F preferably consisting of parallel inner and outer longitudinally extending side beams F' and F" rigidly secured together adjacent their forward and rear ends by suitable cross beams G and G' to which is rigidly connected laterally spaced bracing beams H extending longitudinally at the center of the frame.

Rotatably disposed between the aforesaid inner and outer side beams preferably adjacent their forward ends are laterally extending short shafts J to which are rigidly secured arms J' supporting ground wheels J" on their lower ends.

Said arms J' with the wheels journalled thereon are adjustably connected to a laterally extending shaft K journalled on the inner side beams with a link K' connecting each arm J' to an adjacent arm K" rigidly secured to said laterally extending shaft.

The forward V-shaped ends of the outer side beams have their outer ends apertured and disposed in spaced parallelism to pivotally support the aforesaid draft bar adjacent its rear end by a pivotal bolt L extending therethrough at such point as to provide sufficient leverage on the frame to cause it to remain level when adjusting the same by the wheel operating means heretofore set forth. Said draft bar has its inner end provided with vertical lugs L' connected at their outer ends by a cross bolt L" adapted to close the open end of a slot therebetween and also act as a stop for a cross pin M pivotally and slidably disposed in said slot and connecting companion arms M' having their inner ends rigidly secured to a laterally extending shaft M" journalled on the forward ends of longitudinal extending beams.

Rigidly supported on the plow frame is a centrally disposed power transmission unit N consisting of a casing N' in which is disposed a train of gears O driven by a power shaft O' connected to the tractor and rotating a driven shaft O" in opposite directions by manipulating a reversing clutch P through the instrumentality of a shifting lever P' manually controlled by a hand lever P" connected thereto with its forward end disposed in reach of the tractor operator.

Fixed to the shaft K are spaced upstanding arms Q having elongated slots Q' therein to pivotally and slidably support a threaded cross head Q" disposed on the threaded end of the aforesaid driven shaft so as to rotate the shaft K in elected directions and thereby adjust the frame with plows thereon in various level positions relative to the surface of the ground.

Secured to the shaft K is an upstanding arm U to which is pivotally connected a substantially U-shaped link U' provided with an adjustable bolt U" having a right angular outer end pivotally connected to the upper or outer end of an arm or secured to the shaft M" so as to adjust the line of pull on the frame by the draft bar in accordance with adjustments thereof by the wheel manipulating means.

Each of the aforesaid plows consists of a flat resilient metal bar bent on a curved line approximately at its medial portion to form a substantially horizontal beam R' and downwardly extending shank R" having a forwardly curved lower end to which is removably secured a suitable plow blade S. Secured to the plow beam, as by a suitable clamp S' with its body portion S" resting on the body portion of the plow beam and its shank portion extending outwardly at an angle from the lower end of the curved portion of the plow beam, is a resilient check bar which permits a certain degree of rearward bending of the plow beam shank under normal plowing conditions and resists further bending and possible breaking thereof under abnormal rearward strain placed thereon should the plow blade encounter obstructions. Said plow beams and check bars having body portions of equal length are rigidly secured to the cross beams of the plow frame by suitable clamps T engaging their front end portions.

In order to assist the driven shaft and power transmission means connected thereto in rotating the shaft K in that direction causing the frame to be lifted on the wheels, contractile coil springs T' connect lugs T'' on said shaft to elected points on the frame.

The inner end of the draft bar is disposed between guide standards W rigidly secured to the frame and are provided with a cross pin to limit upward swing or movement of the draft bar.

With this invention fully set forth, it is apparent that means are provided whereby the plow frame and draft bar will be simultaneously adjusted so the line of draft on the frame will cause the plow blades to operate at elected depths in the ground regardless of the contour of the surface thereof.

Having thus described my invention, what I claim and desire to protect by Letters Patent is:

1. The combination with a tractor having a power take-off, a plow frame, wheels swingably disposed on the plow frame, a power transmitting unit mounted on the plow frame, a draft bar pivoted to the forward end of the plow frame with its major portion extending beyond the pivot thereof, a clevis connecting the forward end of the draft bar to the tractor, a laterally extending shaft journalled on the plow frame, arms secured to the ends of said shaft, links connecting the arms to the wheel supports, a short shaft mounted on the plow frame to the rear of said draft bar, companion arms secured to said shaft, a cross pin connecting the outer end of said arms and pivotally and slidably extending through a slot in the rear end of the draft bar, an upstanding arm secured to one end of the short shaft, an upstanding arm secured to the aforesaid laterally extending shaft, a substantially U-shaped link pivotally secured to that upstanding arm on the laterally extending shaft, a bolt adjustably threaded in the outer end of said link and having a right angular outer end pivotally secured to the outer end of that arm on the end of the short shaft, guide standards secured to the forward portion of the plow frame in close proximity to the sides of the inner end of the draft bar, a bolt connecting the upper ends of said standards, upstanding companion arms having elongated slots therein secured to the aforesaid laterally extending shaft, a pivoted and slidable cross head disposed between said companion arms, a drive shaft connected to the transmission unit and having its outer end threadedly engaged with the cross head, a driven shaft connecting the take-off of the tractor with the transmission unit, a reversing clutch connected to the transmission unit, a manually controlled lever connected to the reversing clutch and extending in reach of the operator of the tractor, upstanding lugs secured to the laterally extending shaft adjacent its opposite ends, retractile coil springs connecting said lugs to the plow frame, and plow beams secured to the plow frame at spaced points thereon.

2. The combination with a tractor having a power take-off and a draft beam, of a plow frame supported on vertically adjustable wheels and comprising horizontal wheel supports mounted on the free ends of arms pivoted at their other ends to said frame for swinging movement up and down, a draft bar pivoted to the forward end of the plow frame with its major portion extending forward of said pivot and provided with means connecting it to said draft beam, a laterally extending shaft journalled on the plow frame to the rear of said draft bar provided with an upstanding arm secured near its mid length and having a pair of arms secured one at each of its ends, said pair of arms being provided with links at their free ends connected to the adjacent wheel supporting arms to adjust their up and down swinging movement, a short shaft pivoted to said frame between the rear end of said draft bar and said laterally extending shaft and provided with a bell crank connection one limb of which has means of engagement with the end of said draft bar to move up and down therewith and the other limb of which is connected by a pivoted link with said upstanding arm on said laterally extending shaft, spring means connected to means on said laterally extending shaft and to said frame arranged to counterbalance the weight of said frame on said wheels through said pair of arms and links, and a transmission unit embodying a reversing clutch mounted on said frame and connected with said power take-off by a drive shaft, a driven shaft in said transmission unit and gearing means for rotating it in either direction, manual control means for manipulating said transmission unit to transmit power to said driven shaft to rotate it in either direction at will, said driven shaft having an operative connection with said laterally extending shaft to cause it to rotate in one direction or the other according to the direction of rotation of said driven shaft to raise or lower said wheel supports.

3. The combination with a tractor having a power take-off and a draft beam, of a plow frame supported on vertically adjustable wheels and comprising horizontal wheel supports mounted on the free ends of arms pivoted at their other ends to said frame for swinging movement up and down, a draft bar pivoted to the forward end of the plow frame with its major portion extending forward of said pivot and provided with means connecting it to said draft beam, a laterally extending shaft journalled on the plow frame to the rear of said draft bar provided with an upstanding arm secured near its mid length and having a pair of arms secured one at each of its ends, said pair of arms being provided with links at their free ends connected to the adjacent wheel supporting arms to adjust their up and down swinging movement, a short shaft pivoted to said frame between the rear end of said draft bar and said laterally extending shaft and provided with a bell crank connection one limb of which has means of engagement with the end of said draft bar to move up and down therewith and the other limb of which is connected by a pivoted link with said upstanding arm on said laterally extending shaft, and a transmission unit embodying a reversing clutch mounted on said frame and connected with said power take-off by a drive shaft, a driven shaft in said transmission unit and means connecting said driven shaft with said laterally extending shaft for rotating it to raise and lower said wheel and wheel supports.

References Cited in the file of this patent
UNITED STATES PATENTS

| | | |
|---|---|---|
| 1,653,678 | Strandlund | Dec. 27, 1927 |
| 1,653,695 | Brown | Dec. 27, 1927 |
| 1,675,461 | Paul | July 3, 1928 |
| 1,928,952 | Silver | Oct. 3, 1933 |
| 2,081,346 | Altgelt | May 25, 1937 |
| 2,320,742 | Newkirk | June 1, 1943 |
| 2,338,374 | Baldwin | Jan. 4, 1944 |
| 2,575,563 | Rapp | Nov. 20, 1951 |
| 2,656,778 | Graham | Oct. 27, 1953 |
| 2,664,039 | Heckathorn | Dec. 29, 1953 |